(No Model.)
J. A. DAVISON.
COMBINED PHOTOGRAPHIC CAMERA AND PLATE HOLDER.
No. 376,798. Patented Jan. 24, 1888.
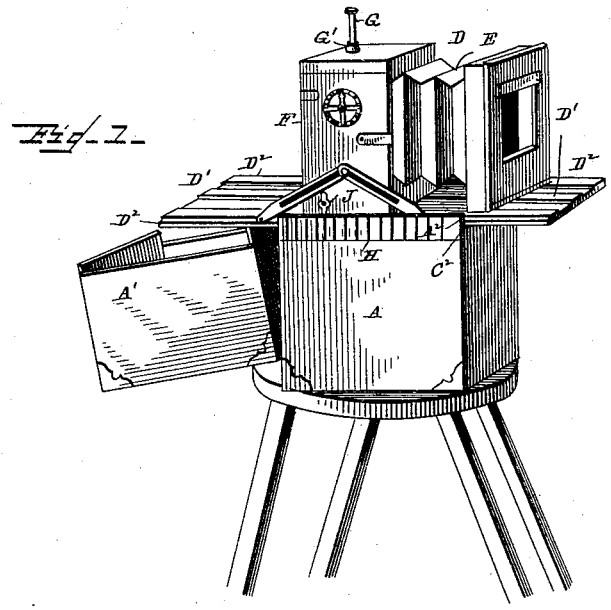
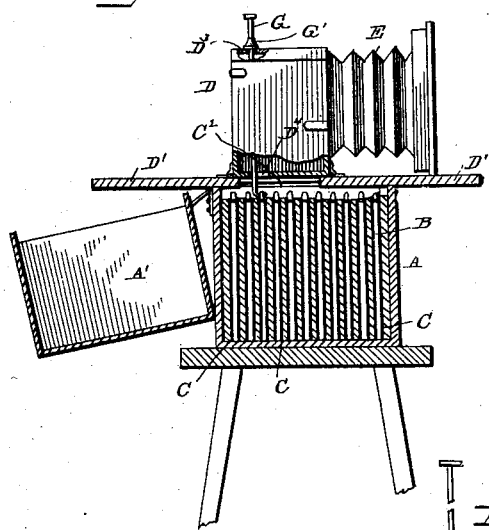
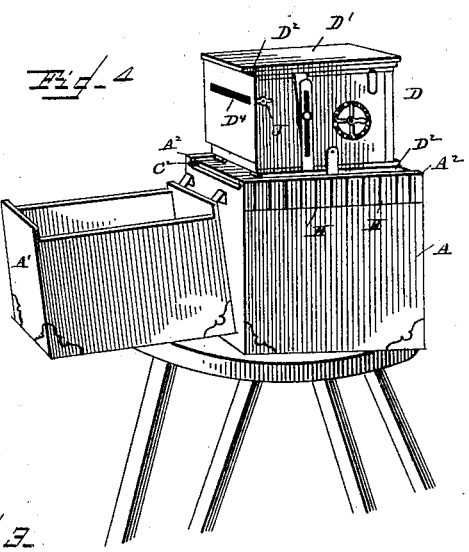
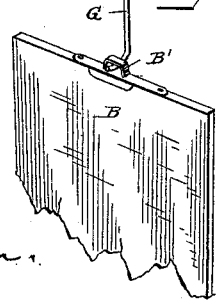
WITNESSES
Edwin L. Yewell
Wm. F. Huntemann
INVENTOR
Joseph Alphonzo Davison
By Manahan & Ward
his Attorneys

UNITED STATES PATENT OFFICE.

JOSEPH A. DAVISON, OF POLO, ILLINOIS.

COMBINED PHOTOGRAPHIC CAMERA AND PLATE-HOLDER.

SPECIFICATION forming part of Letters Patent No. 376,798, dated January 24, 1888.

Application filed July 2, 1887. Serial No. 243,287. (No model.)

*To all whom it may concern:*

Be it known that I, JOSEPH ALPHONZO DAVISON, a citizen of the United States, residing at Polo, in the county of Ogle and State of Illinois, have invented certain new and useful Improvements in a Combined Photographic Camera and Plate-Holder; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to certain improvements in photographic cameras; and it consists, more especially, in a certain relation of such camera to the darkened chamber for holding the prepared plates and means for bringing said plates into the camera without exposing said plates to the light.

While my invention is applicable, of course, to all the conditions under which cameras may be used, it is more particularly advantageous for outdoor work, where it is essential that the plates be prepared for impressions in advance and secluded meanwhile from the light.

My invention consists in providing a receptacle for such prepared plates, and in placing above the same a camera which is adapted to be moved backward and forward in ways formed on the upper end of said receptacle, and in mechanism for drawing the prepared plates from said receptacle into the camera for use, and returning said plates into said receptacle after the impression has been received thereon, without exposing said plates during the process of shifting to any degree of light.

In the drawings, Figure 1 is a side elevation, slightly oblique, of a machine embodying my invention when the same is ready for use. Fig. 2 is a longitudinal section through the center of the same. Fig. 3 is a detail of lifter G and upper edge of plate B, provided with loop or eye B'. Fig. 4 shows the camera and plate-holder in position for transportation, with the cover unfolded.

A is a box, of any suitable size, to contain the prepared plates B, and leaves suitably hinged thereon, a lid, A', which when the machine is in use is thrown back, as shown in Fig. 1, and when the machine is packed is closed over the camera and plates.

C C are narrow compartments formed in the box or receptacle A to receive and hold the plates B. The ends $A^2$ of the box A extend slightly above its general top and the upper edges of the plates B, and in the inner side surface of the ends $A^2$, near the top thereof, are formed grooved ways $C^2$, to hold and allow a sliding movement of the camera D.

The camera D consists of the usual parts and folding ends, D', which, when the camera is opened for use, are folded outward, respectively, from the camera in a horizontal position, the front one forming support for the bellows end of the camera, as shown in Fig. 1. On the edges of the sides D' are formed flanges $D^2$, which are inserted in the ways $C^2$, and serve to hold the camera tightly down upon the top of the box A, so as to exclude the light from the plates B, and at the same time afford means of moving the camera to and fro over the upper edges of said plates B. The camera D may also be provided with flanges.

In the bottom of the camera D is formed a longitudinal slot, $D^4$, of sufficient length and width to permit of the drawing of the plates B, respectively, edgewise up into the camera, as hereinafter described.

The camera when in use is focused by drawing out the bellows E from the front and fastening it in the desired position to end D' in any suitable manner, and closed by means of a hinged door, F, at the back.

G is a vertical removable rod or lifter, which is provided with a hook at its lower end, and is inserted downward through the top of the camera through a suitable hole, $D^3$, in the latter. The hole $D^3$ is made somewhat larger than the lifter G to allow the hook on lifter G to pass through said hole $D^3$. The plate is engaged by turning the hook around into the eye B', formed centrally on plates B.

To suitably close the aperture $D^3$, there is provided the movable washer G' on the rod G. The upper surfaces of the ends D' are marked at intervals corresponding with the compartments C, and pointers J are placed on the sides of the camera D, in a line of prolongation of the longitudinal slot or aperture $D^4$, so that when said pointers are placed directly over any particular mark, H, the slot or aperture $D^4$ will be directly over the corresponding plate B, whereby any one of the desired plates may be drawn up into the camera, and a record may also be kept of such said plates as may have been used without opening either the camera or box A.

On the upper edge of the plates B, respectively, is centrally formed a loop or eye, B', adapted to be engaged by the lower end of the lifter G. One or more of such loops B' can be placed on each plate B, and one or more lifters G used, if desired. The sides D' serve to cover the box A and exclude the light from the plates B as the camera is moved to and fro over said box; and when the plates B, or as many of them as may be desired, shall have been used, the camera is closed for transportation by moving it to one side far enough to bring one of the lids D' over the box A when the camera D is folded down on said lid, and the opposite lid D' folded down on the camera, when the box A can be closed and the entire machine containing the plates B carried to the studio, where said plates can be finished in the usual way.

What I claim as my invention, and desire to secure by Letters Patent of the United States, is—

1. The combination of the box A, provided with compartments C and ways $C^2$, and the camera D, provided with folding sides D' and the flanges $D^2$, and also aperture $D^4$, and means, substantially as shown, for drawing the plates B from the box A into the camera D when the latter is closed, substantially as shown, and for the purpose described.

2. The combination of the box A, provided with ways $C^2$ and compartments C, and engaging-marks H, camera D, provided with the folding sides D', flanges $D^2$, slot $D^4$, and pointers J, and means, substantially as shown, for drawing the plates B up into said camera through said opening $D^4$ and returning the same, for the purpose specified.

3. The combination of the box A, provided with ways $C^2$ and compartments C, adapted to hold the plates B, the camera D and folding sides D', provided with flanges $D^2$, adapted to be seated in and traverse said ways $C^2$, said camera being further provided with a longitudinal slot, $D^4$, adapted to admit the passage of the plates B, respectively, and means, substantially as shown, for drawing plates B from the compartments C in the said camera and returning the same, substantially as shown, and for the purpose described.

In testimony whereof I affix my signature in presence of two witnesses.

JOSEPH A. DAVISON.

Witnesses:
WILLIAM F. CLOTHIER,
CHESTER K. WILLIAMS.